(12) United States Patent
Niehoff

(10) Patent No.: US 9,947,496 B2
(45) Date of Patent: Apr. 17, 2018

(54) CIRCUIT BREAKER WITH HYBRID SWITCH

(71) Applicant: EATON INDUSTRIES (NETHERLANDS) B.V., Hengelo (NL)

(72) Inventor: Ronaldus Niehoff, MB Oldenzaal (NL)

(73) Assignee: EATON INDUSTRIES (NETHERLANDS) B.V., Hengelo (NL)

( * ) Notice: Subject to any disclaimer, the term of this patent is extended or adjusted under 35 U.S.C. 154(b) by 136 days.

(21) Appl. No.: 14/914,001

(22) PCT Filed: Aug. 29, 2014

(86) PCT No.: PCT/EP2014/068420
§ 371 (c)(1),
(2) Date: Feb. 24, 2016

(87) PCT Pub. No.: WO2015/028634
PCT Pub. Date: Mar. 5, 2015

(65) Prior Publication Data
US 2016/0203932 A1    Jul. 14, 2016

(30) Foreign Application Priority Data

Aug. 30, 2013 (GB) ................................. 1315469.5
Nov. 22, 2013 (GB) ................................. 1320673.5

(51) Int. Cl.
*H02H 3/00* (2006.01)
*H01H 47/22* (2006.01)
(Continued)

(52) U.S. Cl.
CPC .......... *H01H 47/223* (2013.01); *H01H 9/542* (2013.01); *H01H 47/32* (2013.01);
(Continued)

(58) Field of Classification Search
USPC .................................................. 361/2–13, 42
See application file for complete search history.

(56) References Cited

U.S. PATENT DOCUMENTS

| 6,643,112 | B1 | 11/2003 | Carton et al. | |
| 7,262,945 | B2 * | 8/2007 | Galang | H02H 3/207 361/90 |
| 8,614,866 | B2 * | 12/2013 | Billingsley | H01H 9/542 361/8 |

(Continued)

FOREIGN PATENT DOCUMENTS

| EP | 1538645 A1 | 6/2005 |
| EP | 2320535 A1 | 5/2011 |

(Continued)

OTHER PUBLICATIONS

Fréderic Sargos: "Application Note AN-8005: IGBT Power Electronics Teaching System Principle for sizing power converters (Rev 00)", Semikron, Sep. 24, 2008 (Sep. 24, 2008), pp. 1-17, XP002732511, Retrieved from the Internet: URL: http://www.semikron.com/dl/service-support/downloads/download/semikron-application-note-an-8005-igbt-power-electronics-teaching-system-en-2008-09-24-rev00.

*Primary Examiner* — Danny Nguyen
(74) *Attorney, Agent, or Firm* — Leydig, Voit & Mayer, Ltd.

(57) ABSTRACT

An alternating current circuit breaker includes a first galvanic separation switch (SW2) and a bypass switch (SW1) in a live line, and a second galvanic separation switch (SW3) in a neutral line, and a semiconductor switch element connected parallel to the bypass switch (SW1). The semiconductor switch element includes a combination of a rectifier bridge (D1-D4) and an isolated gate bipolar transistor (IGBT). A processing unit is connected to a current measurement unit arranged in the live line, and is arranged to control the bypass switch (SW1), first and second galvanic separation switches (SW2, SW3) and the conducting state of the isolated gate bipolar transistor (IGBT) in case of detection of a short circuit condition.

17 Claims, 6 Drawing Sheets

(51) Int. Cl.
 *H01H 47/32* (2006.01)
 *H01H 9/54* (2006.01)
 *H02H 3/02* (2006.01)
 *H02H 3/08* (2006.01)
 *H02H 7/22* (2006.01)

(52) U.S. Cl.
 CPC .............. *H02H 3/025* (2013.01); *H02H 3/08* (2013.01); *H02H 7/222* (2013.01); *H01H 2009/544* (2013.01)

(56) References Cited

U.S. PATENT DOCUMENTS

| | | |
|---|---|---|
| 2005/0146814 A1 | 7/2005 | Sellier et al. |
| 2007/0121257 A1* | 5/2007 | Maitra ................... H01H 9/542 361/2 |
| 2011/0063759 A1 | 3/2011 | Billingsley et al. |
| 2012/0032727 A1 | 2/2012 | Callanan |
| 2013/0154774 A1* | 6/2013 | Bhavaraju .............. H01H 47/18 335/127 |

FOREIGN PATENT DOCUMENTS

| | | |
|---|---|---|
| EP | 2469554 A2 | 6/2012 |
| FR | 2797359 A1 | 2/2001 |
| FR | 2952470 A1 | 5/2011 |
| GB | 2221794 A | 2/1990 |
| WO | WO 2010035082 A2 | 4/2010 |
| WO | WO 2011018113 A1 | 2/2011 |
| WO | WO 2011057675 A1 | 5/2011 |
| WO | WO 2011116832 A1 | 9/2011 |

\* cited by examiner

CIRCUIT BREAKER WITH HYBRID SWITCH

CROSS-REFERENCE TO RELATED APPLICATIONS

This application is a U.S. national stage application under 35 U.S.C. 0371 of International Application No. PCT/EP2014/068420, filed on Aug. 29, 2014, and claims benefit to British Patent Application No. 1 315 469.5, filed on Aug. 30, 2013, and British Patent Application No. 1 320 673.5, filed on Nov. 22, 2013. The International Application was published in English on Mar. 5, 2015, as WO 2015/028634 A1 under PCT Article 21(2).

FIELD

The present invention relates to an alternating current circuit breaker.

BACKGROUND

International patent publication WO2011/018113 discloses a hybrid circuit breaker with a mechanical switch 31 and a semiconductor breaker device 32 parallel to the mechanical switch 31. An embodiment is disclosed wherein the semiconductor device 32 comprises a bridge rectifier 37 and an IGBT 36.

French patent publication FR-A-2952470 discloses a circuit breaker for alternating current applications, using a control unit for controlling an interrupter having a mechanical switch, varistor and semiconductor switch in parallel.

International patent publication WO2011/116832 discloses a hybrid circuit breaker for interrupting a fault current in an electrical circuit line. A mechanical breaker is connected in parallel to a semiconductor device, which takes overcurrent temporarily when the mechanical breaker is opened. In the embodiments disclosed, the semiconductor device is a set of serial or parallel connected controllable semiconductor units, such as thyristors, GTO's, IGBT's or IGCT's.

European patent publication EP-A-2469554 discloses a hybrid switching circuit, comprising a power semiconductor parallel to the switch poles of a controlled electromagnetic relay, it is described that the semiconductor is turning off at a zero crossing of the load current. This makes short circuit switching impossible because the energy must be carried until the zero crossing. In the time period between occurrence of the short circuit and the actual breaking of the circuit, the current and the energy will be much too high to withstand by a semiconductor.

International patent publication WO2011/057675 A1 discloses a high voltage circuit breaker (>10 kV) especially for DC applications, wherein a main breaker, non-linear resistor and a high speed switch are connected in parallel. The main breaker comprises one or more semiconductor switches of a first current direction.

SUMMARY

An aspect of the invention provides an alternating current circuit breaker, comprising: a live line between a live supply connecting terminal and a live load connecting terminal; and a neutral line between a neutral supply connecting terminal and a neutral load connecting terminal, for connecting an alternating current load to a mains supply; a first galvanic separation switch and a bypass switch connected in the live line; a second galvanic separation switch connected in the neutral line; a semiconductor switch element connected parallel to the bypass switch, wherein the first and second galvanic separation switch, the bypass switch and the semiconductor switch element are controlled using a processing unit, wherein the semiconductor switch element includes a combination of a rectifier bridge and an isolated gate bipolar transistor, wherein alternating current terminals of the rectifier bridge are connected in parallel to the bypass switch, wherein direct current terminals of the rectifier bridge are connected to an emitter and a collector terminal of the isolated gate bipolar transistor, wherein the processing unit is connected to a current measurement unit arranged in the live line, wherein the processing unit is arranged to control the bypass switch, the first and second galvanic separation switches, and a conducting state of the isolated gate bipolar transistor in case of detection of a short circuit condition, and wherein the current measuring unit is configured to measure: a momentary value of load current; a speed of increase of the load current; an RMS value of the load current; and/or a time information of the load current.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
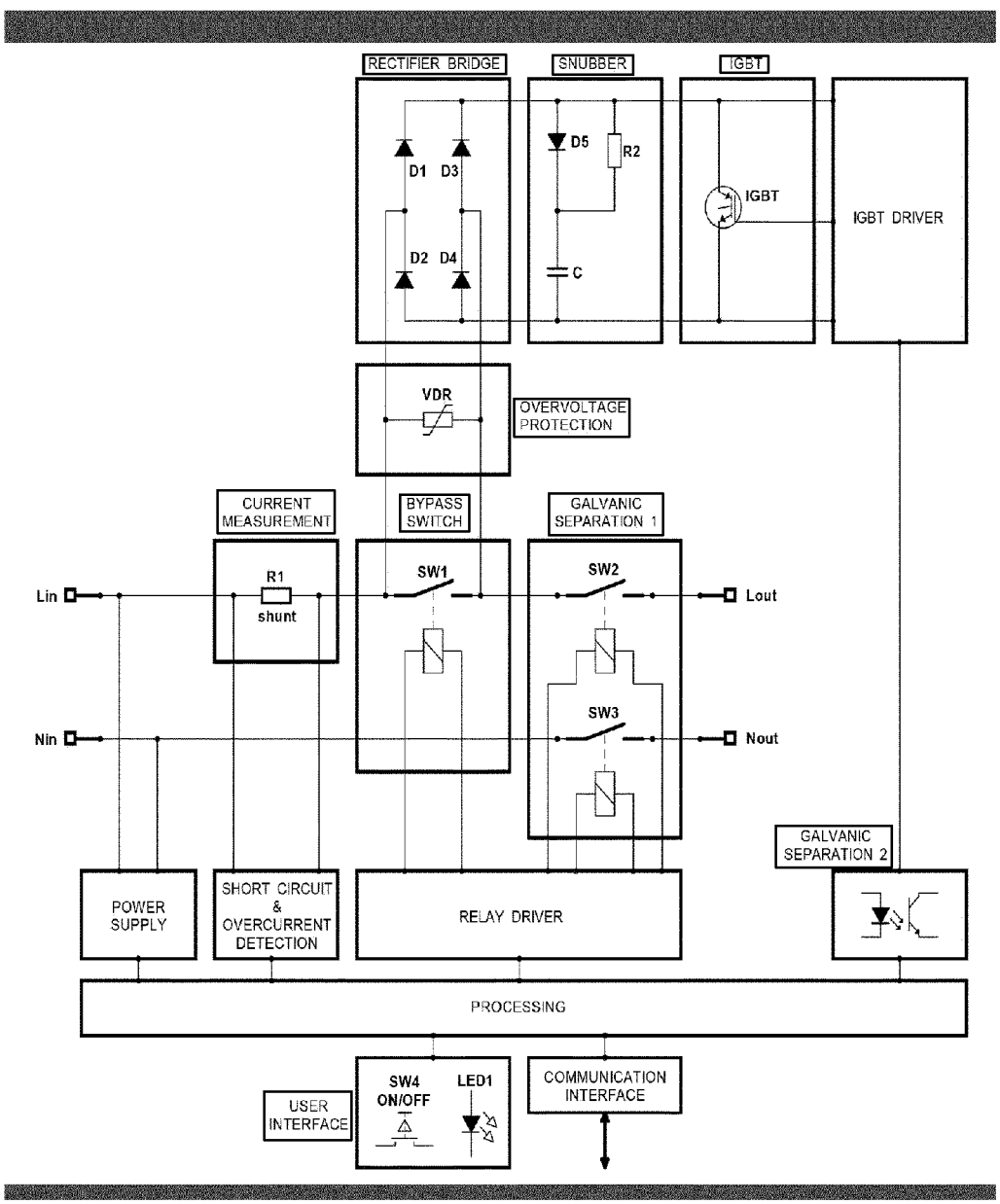
FIG. 1 shows a block diagram of an embodiment of a circuit breaker according to the present invention.

An aspect of the present invention provides an alternating current circuit breaker comprising a live line between a live supply connecting terminal and a live load connecting terminal, and a neutral line between a neutral supply connecting terminal and a neutral load connecting terminal for connecting an alternating current load to a mains supply, comprising a first galvanic separation switch and a bypass switch in the live line, and a second galvanic separation switch in the neutral line, and a semiconductor switch element connected parallel to the bypass switch, wherein the first and second galvanic separation switch, the bypass switch and the semiconductor switch element are controlled using a processing unit.

An aspect of the present invention seeks to provide an improved alternating current circuit breaker of the hybrid type having a high degree of reliability and low heat dissipation.

According to an aspect of the present invention, an alternating current circuit breaker according to the preamble defined above is provided, wherein the semiconductor switch element comprises a combination of a rectifier bridge and an isolated gate bipolar transistor, wherein alternating current terminals of the rectifier bridge are connected in parallel to the bypass switch, and direct current terminals of the rectifier bridge are connected to an emitter and a collector terminal of the isolated gate bipolar transistor, and wherein the processing unit is connected to a current measurement unit arranged in the live line, and is arranged to control the bypass switch, first and second galvanic separation switches and the conducting state of the isolated gate bipolar transistor in case of detection of a short circuit condition. The current measuring unit is arranged to measure one or more parameters from the group of:
- momentary value of the load current (I(t));
- the speed of increase (dI/dt) of the load current;
- RMS value of the load current (<I>)
- time information of the load current (I(t), t1<t<t2).

This combination of elements and functionalities provides for a reliable hybrid type circuit breaker for AC applications. As it is possible to detect exactly when the commutation of the short circuit current from the bypass switch to the IGBT happens, it is possible to control the IGBT to turn off the load current after this trigger moment plus a preset constant delay (in which the contact of the relay implementing the bypass switch has a sufficient distance to carry the remaining voltage of the load). The present invention also allows to obtain all necessary parameters for implementing several functions of the circuit breaker.

E.g., the processing unit is arranged to determine a short circuit situation if:
- the speed of increase of current (dI/dt) is above a predetermined threshold value (which is a measure of load impedance);
- the momentary value of the load current (I(t)) is more than ten times higher than a predetermined nominal load current (In) (which allows to distinguish a short circuit from a high inrush current); or
- the momentary value of the load current (I(t)) is higher than a predetermined current value for longer than a predetermined time period, as derived from the time information of the load current (which also allows to prevent a high inrush current from tripping the circuit breaker).

Furthermore, the processing unit may be arranged to determine an overcurrent situation if the RMS value of the load current is above a predetermined threshold current value (i.e. during a longer time period). This implementation would replace the conventional bimetal overcurrent protection implementation, thus requiring less specialized components for a circuit breaker.

In a further embodiment, the alternating current circuit breaker further comprises a power supply unit connected to the live and neutral supply connecting terminals, which is arranged to provide power to the processing unit and possibly further components of the circuit breaker. This ensures that the entire circuit breaker can remain functional as long as the mains is supplying a voltage.

The circuit breaker may further comprise an overvoltage protection element connected in parallel to the bypass switch, e.g. in the form of a varistor or voltage dependent resistor (VDR).

In an embodiment, the alternating current circuit breaker further comprising a snubber circuit connected to the collector and emitter terminals of the isolated gate bipolar transistor, which implements an overvoltage protection of the IGBT.

The current measurement unit may comprise a shunt resistor in the life line and a short circuit and overcurrent detection unit arranged to measure the voltage across the shunt resistor. This allows to keep a small form factor for a miniature circuit breaker, e.g. compared to an alternative implementation using a Rogowski coil.

In a further embodiment, the bypass switch and the first and second galvanic separation switches are electromechanical relay type switches, and the alternating current circuit breaker further comprising a relay driver unit connected to the processing unit and to coil terminals of the bypass switch and the first and second galvanic separation switches. This allows to implement a complete galvanic separation between mains and load in case of a tripping of the circuit breaker.

In an even further embodiment, the processing unit is arranged to switch on the alternating current circuit breaker by controlling the isolated gate bipolar transistor to its on state (i.e. synchronized by the mains voltage zero crossing) and subsequently controlling the bypass switch to an on state, and wherein the processing unit is arranged to switch off the alternating current circuit breaker by controlling the bypass switch to an off state, and subsequently controlling the isolated gate bipolar transistor to its off state (i.e. synchronized by load current zero crossing).

The processing unit is in an even further embodiment arranged to switch off the circuit breaker in case of a short circuit by controlling the bypass switch to an off state (where the IGBT automatically takes over short circuit current), monitoring the voltage across the isolated gate bipolar transistor, and if the voltage exceeds a predetermined voltage level, controlling the isolated gate bipolar transistor to its off state. The latter step can be executed very quick, i.e. within 500 µs or even less (100 µs) in case of short circuit at turn on of the circuit breaker.

The alternating current circuit breaker may further comprise an IGBT driver unit connected to the processing unit and a control input of the isolated gate bipolar transistor, wherein the IGBT driver unit is arranged to switch off the isolated gate bipolar transistor in a two-stage process. This allows to prevent dangerous overvoltages across the IGBT, and to avoid SOA (Safe Operating Area) problems.

The IGBT driver unit may be further arranged to monitor the voltage across the IGBT, e.g. to determine the bypass switch status, or to initiate a delay time in controlling the relay contact.

The alternating current circuit breaker further comprises a user interface connected to the processing unit in a further embodiment, e.g. in the form of a test switch and/or a status indicator. Furthermore, the alternating current circuit breaker may comprise a communication interface connected to the processing unit, in order to allow remote operation and monitoring.

Reliability and heat dissipation of present short circuit disconnection switches is a problem, especially in widely used alternating current (AC) installations. Disconnection of the line from the load is normally done by a contact, but any mechanical contact should be avoided because of reliability and arcing problems. With the current semiconductor technology it is possible to replace a traditional contact by a semiconductor, however a semiconductor has a voltage drop. This voltage drop causes a dissipation of several Watts and this is not allowed or possible in a small miniature circuit breaker (MCB) enclosure. For this reason a parallel (bypass) contact is used to take over the load current from the semiconductor. The switching capability of the bypass contact however is much less demanding than the switching capability of a traditional (relay) contact, since it only needs to carry (and not switch) the current.

However in case of a short circuit the bypass switch must open very fast and also the semiconductor must be able to decrease/interrupt the already high load current. This makes a special construction of the bypass switch necessary since the opening time must be very short. It also makes a special semiconductor driver circuit necessary so that in all possible circumstances no breakdown of the semiconductor can occur.

Another problem with traditional MCB's is that when modern loads are used there are all kinds of SMPS's (Switch Mode Power Supply) used with a high capacitive input circuit which cause high inrush currents. These high inrush currents are difficult to distinguish from real short circuits. These inrush currents have a time frame of a few milliseconds maximum and in this time frame the behavior of traditional MCB's is not well-defined and is also difficult to control. These high inrush currents can cause nuisance (unwanted) tripping of the MCB at switching on the SMPS loads or at power interruptions especially when the moment of connection is at an unfavorable position of the mains sine.

Another problem with traditional MCB's and used modern loads is that due to the above described high peak load currents during inrush welding of the contacts can occur. This can occur since the high inrush currents can be that short that the traditional short circuit coil is not fast enough and does not interrupt.

By the combination of the electronic short circuit detection and the hybrid switch this risk is avoided in the present invention embodiments as described herein.

In FIG. 1 a block diagram is shown of an embodiment of a circuit breaker according to the present invention. The alternating current circuit breaker comprises a live line between a live supply connecting terminal Lin and a live load connecting terminal Lout, and a neutral line between a neutral supply connecting terminal Nin and a neutral load connecting terminal Nout for connecting an alternating current load to a mains supply AC. The circuit breaker comprises a first galvanic separation switch SW2 and a bypass switch SW1 in the live line, a second galvanic separation switch SW3 in the neutral line, and a semiconductor switch element connected parallel to the bypass switch SW1, wherein the first and second galvanic separation switch SW2, SW3, the bypass switch SW1 and the semiconductor switch element are controlled using a processing unit. The semiconductor switch element comprises a combination of a rectifier bridge D1-D4 and an isolated gate bipolar transistor IGBT. Alternating current terminals of the rectifier bridge D1-D4 are connected in parallel to the bypass switch SW1, and direct current terminals of the rectifier bridge D1-D4 are connected to an emitter and a collector terminal of the isolated gate bipolar transistor IGBT. The processing unit is connected to a current measurement unit arranged in the live line, and is arranged to control the bypass switch SW1, first and second galvanic separation switches SW2, SW3 and the conducting state of the isolated gate bipolar transistor IGBT in case of detection of a short circuit condition.

The rectifier bridge D1-D4 is needed since the IGBT is only conducting in one direction (transistor). It must carry the same current as the IGBT, so also a short circuit. Another solution would be to use to 'anti-parallel' IGBT's with series diodes (to carry the reverse voltage in the OFF state of the IGBT), but this would make the complete circuit more complex and expensive.

With the present state of the technology no other semiconductor solutions are possible. There are FET's with a very low channel-resistance, but these are not available as both high voltage/high current type. Triac's and thyristors cannot be used since they are only able to turn off in the zero crossing and this takes too much time. In case of short circuit they cannot be easily forced to switch off and will blow up finally.

GTO's (gate turn off thyristor) and IGCT (integrated gate-commutated thyristor) need a lot of energy to keep them in the ON state and to turn OFF. Also the driver circuit would be much more complex.

The processing unit is arranged to accommodate the measurement inputs, calculation software and output signal logic and drivers. Most time critical processes can be realized by an EPLD or logic ports, but most of the functionality can be integrated in a µP (microprocessor). Primary functions which are included in the processing unit, and which are explained in more detail below where necessary are:

Mains voltage measurement.
Mains current measurement & calculating overcurrent characteristic (for replacing the bimetal overcurrent protection).
Mains voltage & current synchronization.
Temperature measurement for different components in the MCB (e.g. IGBT and shunt resistor R1).
Driver logic for the relay drivers (including energy monitor of the storage capacitors).
Communication to the IGBT driver unit, user interface and communication interface.
Programming/preset interface for programming (over) current characteristics and a calibration procedure.
Internal storage of data in case of power interruptions (e.g. contact status, mains current history for the overcurrent protection).

The current measurement is done by a shunt. In an embodiment, the current measurement unit comprises a shunt resistor R1 in the life line and a short circuit and overcurrent detection unit arranged to measure the voltage across the shunt resistor R1. A shunt is the most logic choice for this application since the accuracy and linearity is superior to other components. Also the size is small and price/availability is reasonable. An alternative would be a Rogowski coil which is also accurate over a wide range and in high current applications. The disadvantage is that a Rogowski coil is much bigger and the output signal is much lower which makes an integrated/combined design for short circuit protection and (small) current/energy measurement more difficult. The value of the shunt resistor R1 must be chosen such that at nominal load current there is a low dissipation, e.g. 45 A/100 µΩ⇒0.2 W. The shunt resistor R1 must be capable to withstand the short circuit current for a short time, e.g. 1.5 kA/100 µΩ/1.5 ms⇒225 W/0.34 Joule.

The short circuit and overcurrent detection may be implemented using an analog or digital circuit which must be fast enough to detect the short circuit. It also must be accurate enough to sense small load currents for energy measurement purposes. A logical solution is an opamp circuit or integrated (analog ASIC) circuit, but also digital circuits with a high sampling rate are possible.

An over- and short circuit detection is done by monitoring the combination of one or more of a number of parameters:

The momentary value of the load current (I(t)).
The dI/dt (speed of the increase) of the load current.
RMS load current (<I>).
Time information (duration) of the load current (I(t), t1<t<t2).

The dI/dt is a direct measure for the load impedance at power on and if this impedance is below a certain value this may be seen as a short circuit. In this case the dI/dt (increase speed of the current) is high, i.e. exceeds a predetermined threshold value. The allowed dI/dt is tuned at the prospective short circuit current capability, e.g. 6 kA or 10 kA. Of course also the momentary value of the load current must be taken into account. Many modern load types do have a very high inrush current and this must be distinguished from a short circuit. So the momentary value of the load current were a short circuit may be detected is above about 10*In (ten times the nominal current). For a 45 A device this is about 600 Apeak.

The RMS load current is mainly used to detect overcurrents, i.e. if the RMS value of the load current is above a predetermined threshold current value for a predetermined amount of time, an overcurrent situation is detected. Short circuits are too short to measure the traditional RMS values. The time duration of a peak load current can be used to distinguish the inrush currents from real short circuits in the algorithm for the short circuit detection, e.g. by determining if the momentary value of the load current (I(t)) is higher than a predetermined current value for longer than a predetermined time period, as derived from the time information of the load current.

As shown in the embodiment of the block diagram of FIG. 1, the bypass switch SW1 and the first and second galvanic separation switches SW2, SW3 are electromechanical relay type switches. The alternating current circuit breaker further comprises a relay driver unit connected to the processing unit and to coil terminals of the bypass switch SW1 and the first and second galvanic separation switches SW2, SW3. The bypass switch SW1 bypasses the semiconductor IGBT after this is turned on. It will take over the current from the IGBT to decrease the power loss of the MCB at normal operation. It needs only to switch at a few volt, this is the voltage across the IGBT and the bridge. The contact distance is small since the maximum voltage is limited by the varistor overvoltage protection VDR.

Because the product standards for MCB specify a galvanic separation, contacts SW2 and SW3 are added. These contacts have a big contact distance (>3 mm) but do not have high switching capabilities; they only need to carry the load current. The construction of the galvanic separation 1 circuit can be with two driving coils (both SW2 and SW3 have their own coil), or with one driving coil with two contacts. The construction with two driving coils allows more timing flexibility for the phase and neutral contact. It is often chosen that first the neutral contact SW3 closes before the phase contact SW2 closes (and at opening first the phase contact SW2 opens before the neutral contact SW3 opens).

Furthermore, in a further embodiment, the alternating current circuit breaker comprises a power supply unit connected to the live and neutral supply connecting terminals Lin, Nin), which is arranged to provide power to the processing unit (and possibly further components of the circuit breaker).

The power supply unit is connected close to the power supply terminals Lin, Nin and is always supplied if there is a mains voltage present. It is also the interface for the mains voltage measurement and synchronization to the processing unit. The power supply also charges capacitors in the relay driver to provide the energy of the relays. It must be ensured that in all mains situations there is sufficient energy stored in the capacitors to disconnect the bi-stable relays.

The relay driver may have H-bridge drivers to supply the bi-stable relays. The relays need only a small pulse to change from state ON-OFF or OFF-ON. In the steady state they do not need any power to save energy. Safe operation of the MCB is ensured by the storage capacitors in the relay driver and the energy monitor.

Note that the configuration from the diagram shown in FIG. 1 and described herein is a 1 pole+N configuration (only overcurrent and short circuit protection in the phase). If a 2 pole device is needed a second bypass switch, overvoltage protection, rectifier bridge, snubber, IGBT and IGBT driver are included in a further embodiment. Also more complex configurations of the mains supply with multiple poles (e.g. 3 phase, 3 phase+neutral, or even 4 phase) can be accommodated by further embodiments with associated additional components.

Figure 2:
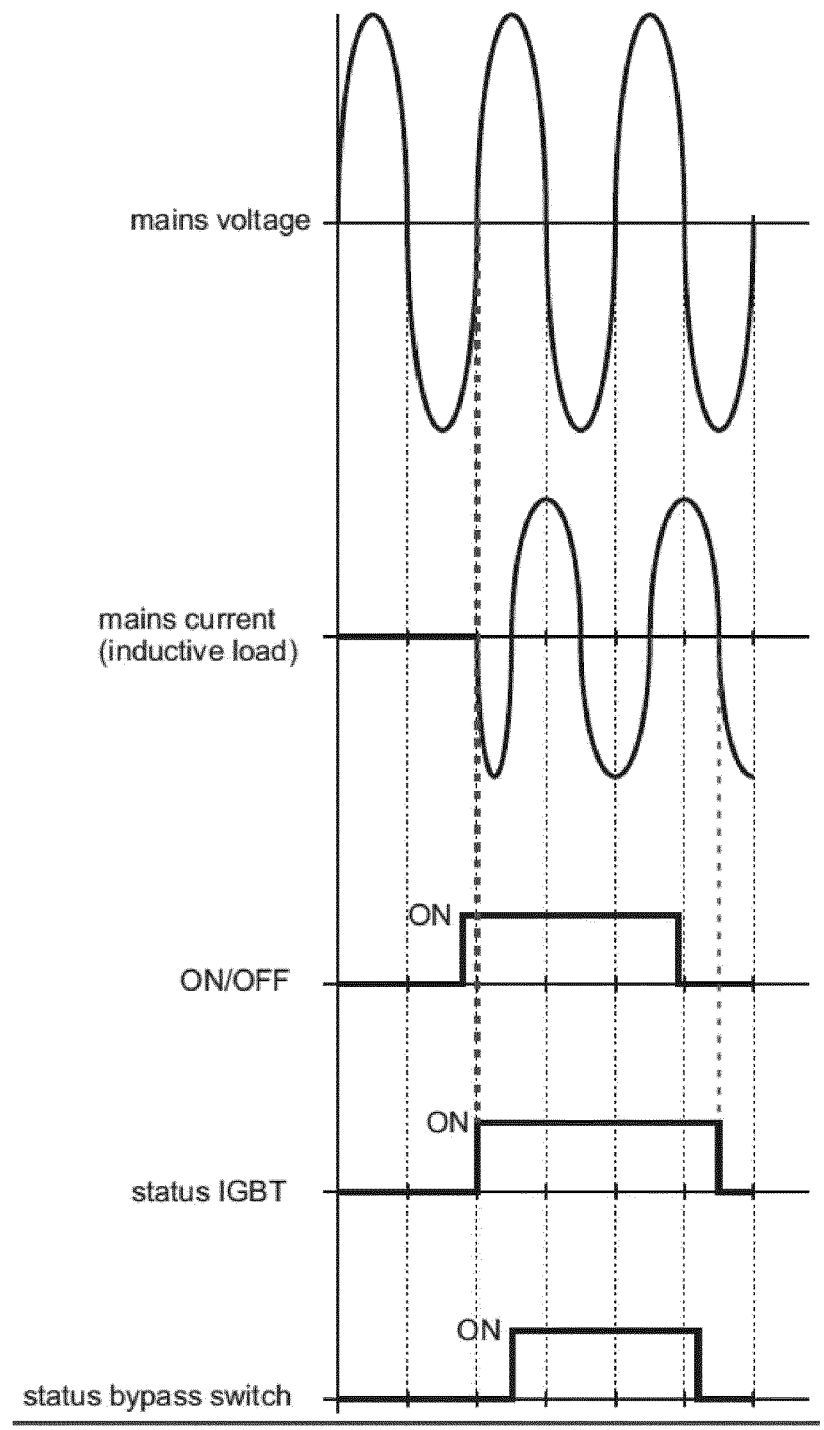
FIG. 2 shows a timing diagram relating the mains voltage and mains current to the switching of the isolated gate bipolar transistor and the bypass switch at ON/OFF switching of the circuit breaker.

The procedure for normal ON and OFF situations is as follows (see also the timing diagram shown in FIG. 2):

Normal ON: ON command (not synchronized); IGBT ON (synchronized at the mains voltage); BYPASS switch ON (not synchronized).

Normal OFF: OFF command (not synchronized); BYPASS switch OFF (not synchronized); IGBT OFF (synchronized at the mains load current).

The IGBT turns ON at the zero crossing of the mains voltage since then the inrush currents will be at a minimum. The IGBT turns OFF at the zero crossing of the mains load current since the remaining energy in the load will be at a minimum; this will help to turn OFF with the lowest energy dissipation for the varistor (overvoltage protection) and the snubber.

In other words, the processing unit is arranged to switch on the alternating current circuit breaker by controlling the isolated gate bipolar transistor IGBT to its on state, (synchronized by mains voltage zero crossing) and subsequently controlling the bypass switch SW1 to an on state, and the processing unit is arranged to switch off the alternating current circuit breaker by controlling the bypass switch SW1 to an off state, and subsequently controlling the isolated gate bipolar transistor IGBT to its off state (synchronized by load current zero crossing).

Figure 3:
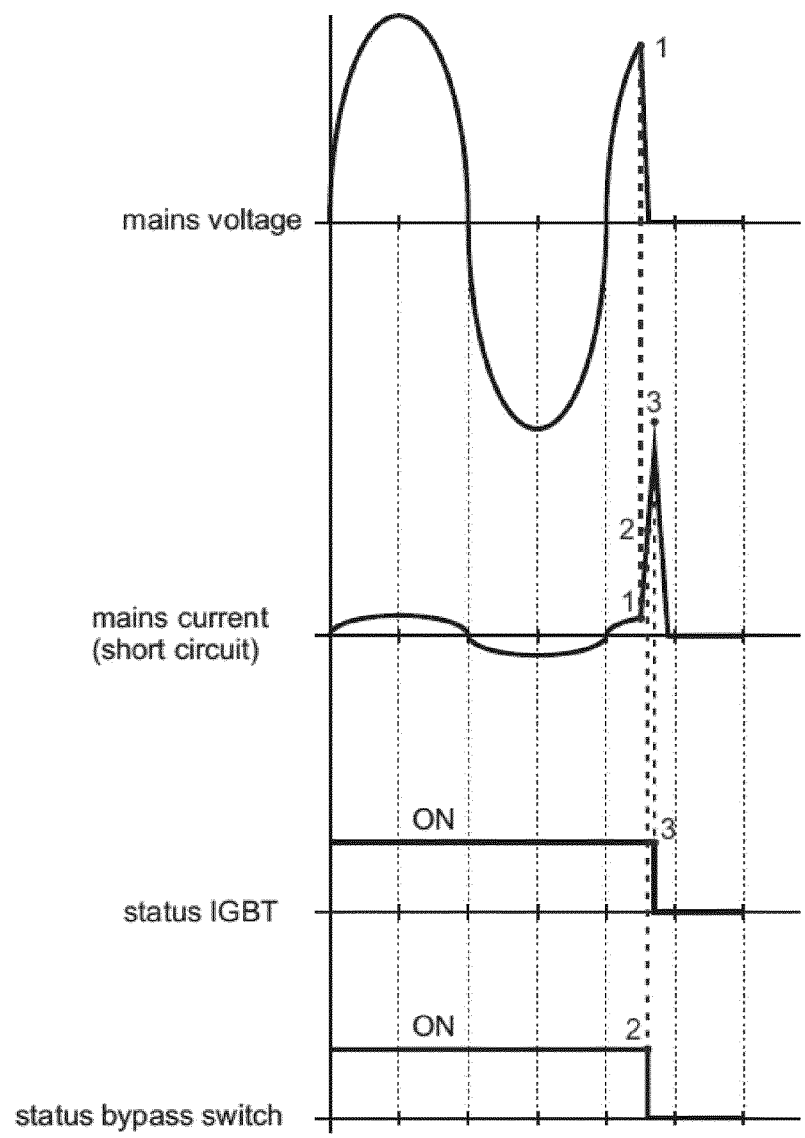
FIG. 3 shows a timing diagram relating the mains voltage and mains current to the switching of the isolated gate bipolar transistor and the bypass switch at a short circuit OFF switching of the circuit breaker.

The procedure at a short circuit situation is as follows (see also the timing diagram shown in FIG. 3):

A short circuit during normal operation is detected by the short circuit detection circuit (point 2 from FIG. 3). Depending on the value of the current and dI/dt it will process an OFF command to the bypass switch first (also point 2 from FIG. 3). If this bypass switch opens the IGBT will automatically take over the short circuit current since this is still in the ON state (point 3 from FIG. 3). Since the short circuit current is rising very fast to high level the voltage drop across the IGBT will also rise to a few volts (IGBT is going into saturation).

This voltage drop will be detected by the IGBT driver and it will turn off the IGBT after a fixed delay which is determined by the relay. This delay is chosen as short as possible, but the delay time is ensuring that the opening distance of the relay contact is enough to isolate the remaining voltage of inductive loads (at a maximum of the VDR voltage) after the disconnection. The delay time of the relay contact is calculated from the moment of increased IGBT voltage (relay is already moving into the open position) until the needed contact distance is reached, for small MCB's this is in the range of 50 . . . 300 µs. Because the voltage increase across the IGBT is measured which is starting point of the time delay no unnecessary/additional time is added to the short circuit interruption time.

By this mechanism the mechanical time delay and tolerance of the bypass relay is perfectly synchronized with the IGBT; no unnecessary/additional time is added to the short circuit interruption time. The full short circuit interruption time frame is within 100 . . . 500 µs to prevent from too high currents in the IGBT and bridge.

Thus, in a further embodiment, the processing unit is arranged to switch off the circuit breaker in case of a short circuit by controlling the bypass switch SW1 to an off state (IGBT automatically takes over short circuit current), monitoring the voltage across the isolated gate bipolar transistor, and if the voltage exceeds a predetermined voltage level, controlling the isolated gate bipolar transistor to its off state (i.e. the IGBT driver unit will turn off the IGBT).

At a short circuit directly at ON the behavior is similar to the situation as described above (short circuit during normal operation). The difference is that the bypass switch is not yet closed and because of the short circuit the voltage drop across the IGBT will immediately rise to a few volts (IGBT is going into saturation, i.e. in fully conducting state). As a result the IGBT driver will again immediately turn off the IGBT. This time frame is much shorter (<100 µs) than the interruption time at a short circuit at normal operation since the bypass switch is not yet closed.

By this mechanism (beside the short circuit detection also an IGBT voltage/saturation monitor which can close the IGBT) it is impossible that the IGBT will be damaged by too high (short circuit) currents of any kind. The remaining load energy occurring in the sequences as described above can be absorbed by the snubber circuit C, R2, D5 and/or the overvoltage protecting element VDR as will be described in more detail below.

The bypass relay has a contact opening time delay which is the most critical parameter for disconnection of circuit breakers with higher short circuit ratings. If the time delay for the disconnection of a short circuit is too high, the short circuit current will increase to high values which must be interrupted by the IGBT. A higher interrupting current needs a thicker wiring, more powerful IGBT, bridge diodes and overvoltage limiting VDR (which is placed across the bypass switch contact) and will stress the installation wiring more. Also the energy in the short circuit is higher so the danger and risk for fire is higher.

On the other hand it is also evident that the decision whether an overcurrent is a short circuit or not takes time. A short/peak overcurrent can also been caused by switching ON a capacitive load. To separate the moment of the short circuit detection decision moment from the bypass relay opening command the following embodiments are added to the embodiments included in the description above.

The advantages are that higher prospective short circuit ratings are possible and a better performance of the MCB, as well as an improved nuisance tripping behavior. In the additional embodiments, the processing unit is arranged to control the circuit breaker by controlling the bypass switch (SW1) to an off state immediately upon detection of an overcurrent situation and subsequently controlling the isolated gate bipolar transistor (IGBT) to its off state upon detection of a short circuit situation or controlling the bypass switch (SW1) to an on state upon detection of a non-short circuit situation.

In the earlier described embodiments, the following short circuit disconnection sequence is applicable:

After the establishing of an overcurrent situation (detected e.g. by an analog part of the circuit breaker, using the shunt, an amplifier, a rectifier and a combined dI/dt circuit/momentary value circuit) it is subsequently decided whether this situation must be seen as an actual short circuit situation or not. Due to this short circuit detection algorithm the detection time is at least 30 . . . 60 µs.

After the decision is made that the measured current must be seen as a short circuit the bypass switch SW1 is opened immediately using the relay coil. The bypass switch SW1 opening thus takes time because of the mechanical movement of the armature. At the opening of the bypass switch contact a timer is started for the contact distance. This is also a time delay in the sequence of the total short circuit disconnection. After this time delay for the contact distance the IGBT is opened and the short circuit is interrupted/disconnected.

Figure 4:
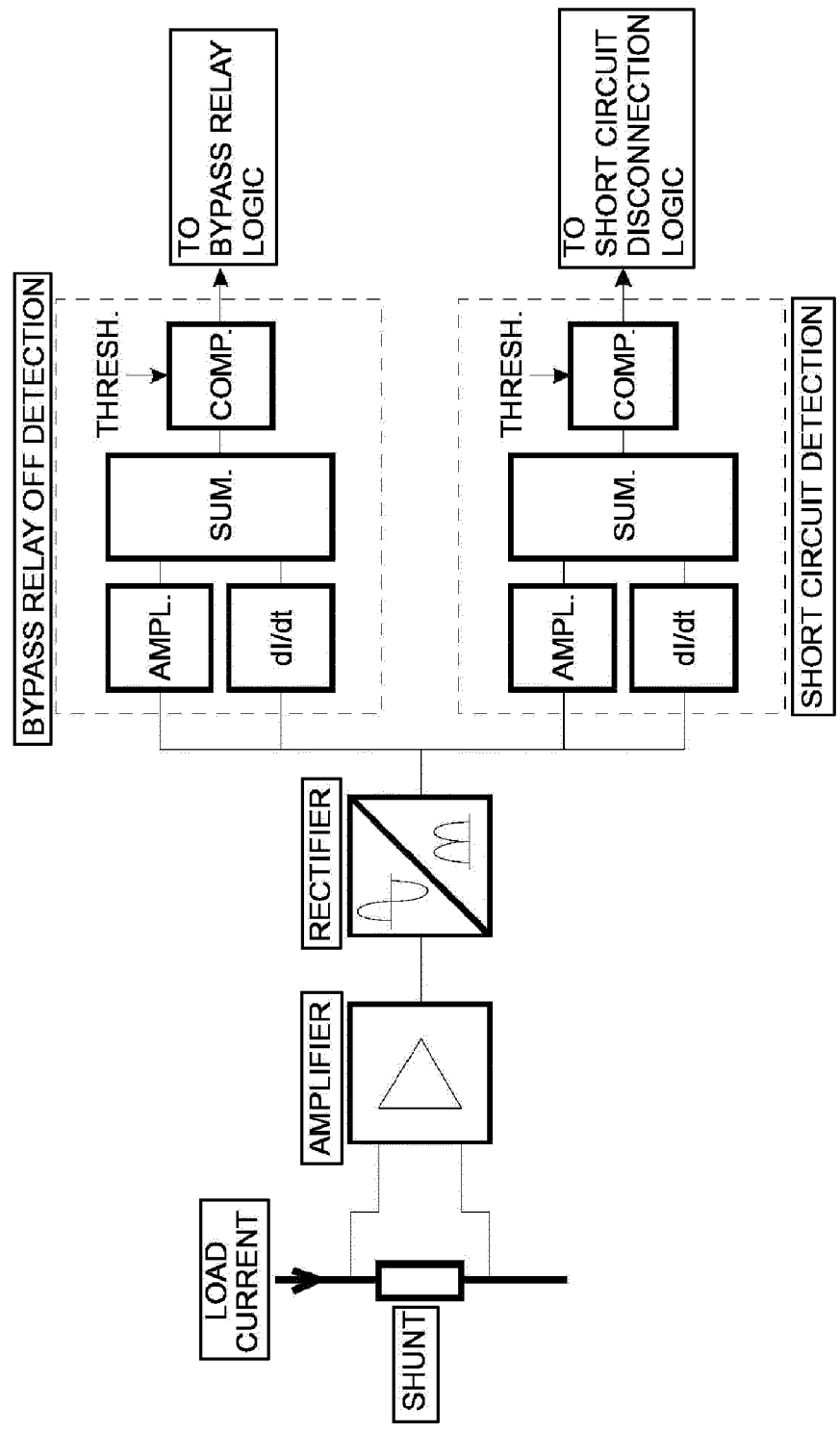
FIG. 4 shows a block diagram of an exemplary implementation of detection of overcurrent and short circuit.
Figure 5:
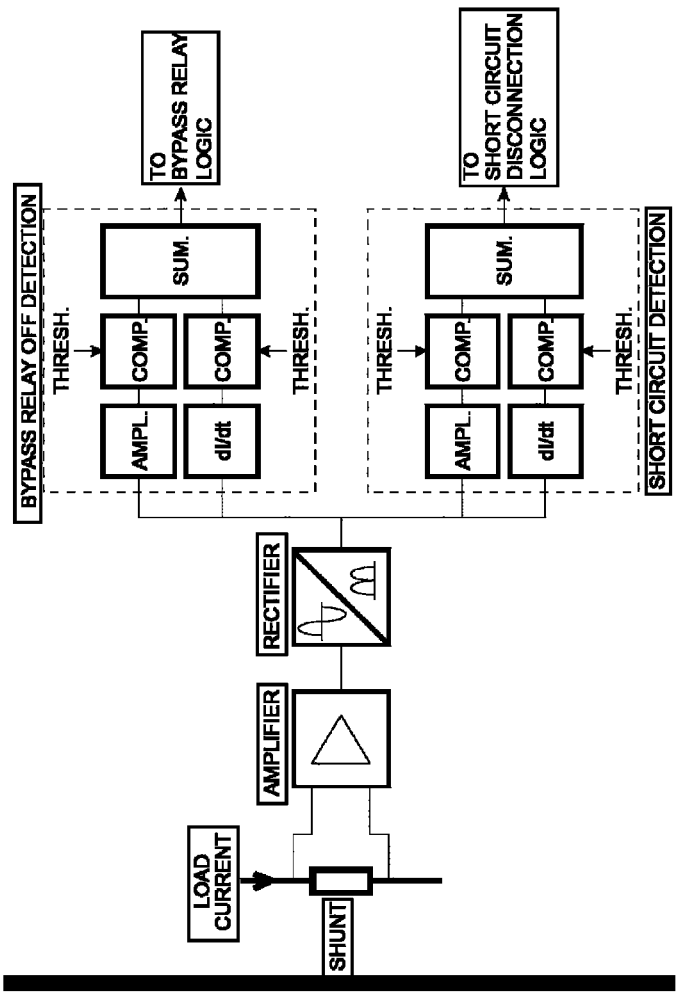
FIG. 5 shows a block diagram of an alternative implementation of detection of overcurrent and short circuit.

The moment of the short circuit decision and the moment for the bypass relay opening command (i.e. the bypass relay off detection and short circuit detection) is separated in a further group of embodiments, shown schematically in the block diagrams of FIGS. 4 and 5. Note that a short circuit detection will not immediately result in an IGBT off command, as also the contact opening time of the bypass switch SW1 is taken into account.

Both block diagrams have a similar functionality, only the way of combining the momentary value of the load current and the dI/dt (current rise factor of the load current) is different. These can be separately compared with a predetermined threshold (FIG. 5 embodiment) or already added in an summation amplifier and together compared with a predetermined threshold (FIG. 4 embodiment).

The description below is based on the embodiment of FIG. 4, but similar processing of signals takes place in the embodiment of FIG. 5.

The load current is measured by a shunt resistor R1 in the live line Lin, see also FIG. 1 and the description thereof above. There is an analog amplifier and a rectifier circuit to process the load current signal for further detection. The rectified signal is used in the two detection circuits, Bypass relay OFF detection and Short circuit detection The bypass relay OFF detection circuit (detection of overcurrent situation) is adjusted/set with the shortest possible time delay so that this is not triggered constantly and not nervous reacting on every small load peak current.

The short circuit detection circuit (detection of short circuit situation) is adjusted/set with the parameters of an accurate detection of the short circuit with a maximum resistance to nuisance tripping. This detection is slower than the bypass relay OFF detection.

The change in the sequence compared to the other embodiments described above is as follows for this group of embodiments:

After the establishing of the short circuit or any other high peak current the command 'bypass relay OFF' will be given by the bypass relay OFF detection circuit.

In parallel in the short circuit detection circuit it is determined whether the peak current must be seen as a short circuit or not.

If it is a short circuit the MCB will open as in the original sequence (after the time delay of the bypass relay contact distance); if it is not a short circuit the bypass relay will be reclosed again after a while.

The advantage of this alternative sequence is that the time delay of the bypass switch SW1 opening is not starting after the actual detection of the short circuit, but already at an earlier stage. This has no influence for the load voltage/current since this is still powered via the IGBT. Because the opening of the bypass switch relay starts earlier, the momentary current at the opening of the contacts (the moment where the commutation is starting) is lower as in the original sequence (can be even 150 A lower in case of a prospective short circuit of 10 kA), which is less demanding for the contact in case of disconnecting a short circuit.

The advantage is also that the short circuit detection time is not anymore an extra delay to the total disconnection time, so a longer period is available for an accurate detection of the short circuit. This also helps to distinguish real short circuits from short inrush peaks or any other EMC effect.

Because the total delay time of a short circuit disconnection is now reduced as compared to the embodiments described above the MCB has a better performance (lower $I^2t$) at breaking a short circuit. Also higher prospective short circuit ratings are possible within the same system hierarchy.

Figure 6:
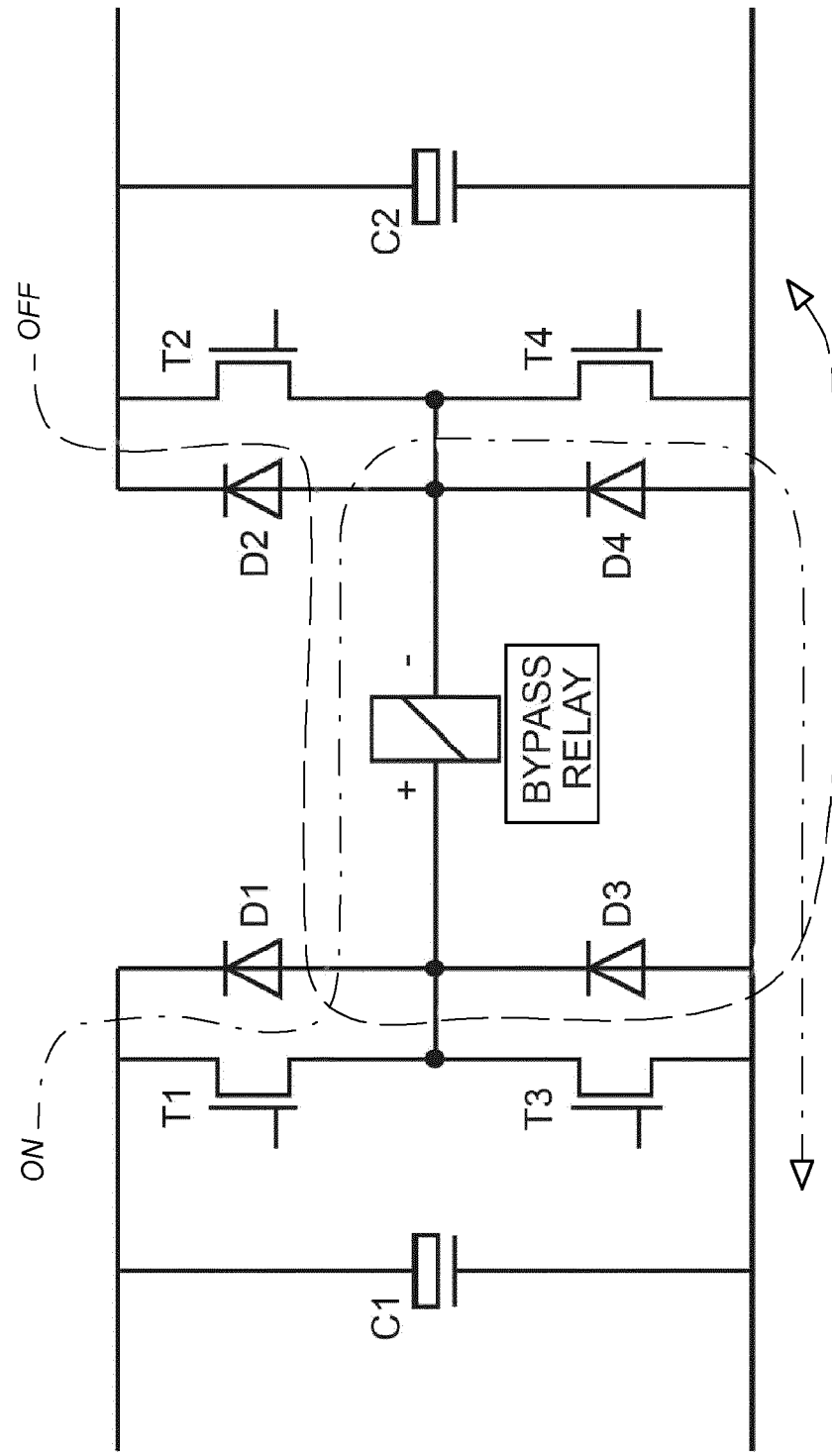
FIG. 6 shows an electrical circuit diagram of an implementation of the bypass switch relay driver unit shown in FIG. 1.

In the block diagram shown in FIG. 6 a possible bypass switch relay driver circuit with separated ON and OFF command storage capacitors is shown. This embodiment of the bypass switch relay driver can be applied in all embodiments described herein, but is especially advantageous in the embodiments described in relation to FIG. 4 and FIG. 5.

In the circuit embodiment of FIG. 6 the bypass switch relay is a bi-stable magnetic latch type relay. There is no energy needed to keep it in the OFF or ON position. The relay has one coil and is driven by a short current pulse.

In the circuit above the ON command is given by de-energizing capacitor C1 (by H-bridge transistor/FET's T1 and T4). The OFF command is given by de-energizing capacitor C2 (by H-bridge transistor/FET's T2 and T3).

The advantage of a separated ON and OFF command storage capacitor is that the commands can be given in a very fast sequence. This reduces the time between ON and OFF/OFF and ON. In some cases this time is crucial, e.g. in the following situation: The MCB is switched ON e.g. by a manual toggle. First the IGBT will start conducting and connects the load to the line voltage. After some time (when there is no short circuit detection) also the bypass relay will be switched ON. This is the normal ON-procedure (see also the description above).

If directly after the bypass relay switch ON command a short circuit is detected, the bypass relay ON command is immediately stopped and an OFF command is given. This is also possible in the case that the armature of the bypass relay is already moving to the ON position.

By this hierarchy/sequence there is no additional delay in the rare case of an OFF command due to a short circuit in the time frame of the normal bypass relay ON-procedure.

In a further embodiment, the alternating current circuit breaker further comprises an overvoltage protection element VDR connected in parallel to the bypass switch SW1. The overvoltage protection element, or overvoltage protection varistor VDR protects the bridge diodes D1-D4 and IGBT against too high overvoltage's after a short circuit disconnection. In the (inductive) load still a lot of energy may be remaining and this does result in a high peak voltage after the disconnection. This high peak voltage is absorbed by the varistor VDR. Of course the shorter the time frame for the disconnection is (fast bypass contact), the smaller the remaining energy in the mains load network is and the smaller the absorbed energy of the varistor VDR is.

In an even further embodiment, the alternating current circuit breaker further comprises a snubber circuit C, R2, D5 connected to the collector and emitter terminals of the isolated gate bipolar transistor IGBT. The snubber circuit is a standard RCD snubber to clamp the voltage during turning off the IGBT. The snubber circuit starts clamping directly after turn off and the varistor VDR at about 900V. Both take a part of the absorbed energy due to the remaining energy in the mains load network.

The alternating current circuit breaker of a further embodiment further comprises an IGBT driver unit connected to the processing unit and a control input of the isolated gate bipolar transistor, wherein the IGBT driver unit is arranged to switch off the isolated gate bipolar transistor in a two-stage process (or in alternative wording the IGBT driver unit is a two-step turn-off IGBT driver). The IGBT driver unit may further be arranged to monitor the voltage across the IGBT.

The second galvanic separation circuit (Galvanic Separation 2 in the embodiment shown in FIG. 1) comprise one or more optocouplers for communication between the processing and IGBT driver unit. Also a small galvanic separated SMPS may be provided inside the IGBT driver unit to supply the IGBT driver circuit since this driver circuit is on another voltage potential than the other circuit parts of the circuit breaker.

The IGBT driver unit contains the following functions (possibly as separate circuits):

Two step output driver of the IGBT

Voltage (de-saturation) monitor of the IGBT collector-emitter voltage

Bypass switch status monitor

IGBT driver monitor

IGBT ON/OFF input

For turning off the IGBT in case of a short circuit disconnection, the IGBT driver unit will decrease the gate voltage of the IGBT in two steps. This action avoids both dangerous overvoltage across the IGBT, and SOA problems, especially at short circuit turn-off. The turn-off delay is about 1 µs: in this time the voltage level of the gate will be about half the normal on-voltage.

The bypass switch status monitor function detects whether the bypass switch SW1 is closed; this is done by checking the voltage across the IGBT. The status information of SW1 is forwarded to the processing unit, and can then be used for the delayed turn-off command for the IGBT in case of a short circuit.

The IGBT driver monitor checks power supply voltage of the driver circuit, this is forwarded to the processing unit. If this voltage is too low the IGBT will be in the off-state and this is a fail situation in normal operation.

The IGBT ON/OFF input receives the ON/OFF command from the processing unit.

In a further embodiment, the alternating current circuit breaker further comprises a user interface connected to the processing unit. The user interface e.g. comprises a test switch and a status indicator. The user interface is e.g. only a push button or a toggle switch with some LEDs to signal the status of the MCB (Powered/ON/OFF/failure etc.). There is no traditional toggle needed.

Furthermore, the alternating current circuit breaker may comprise a communication interface connected to the processing unit, allowing remote operation and monitoring. The communication interface is used to send all possible data to any medium (e.g. bus-system, internet or EIBA), wired or wireless (RF/IR).

In summary, the main idea of the present invention embodiments is to replace the traditional high-current contact, arc-chamber and short circuit actuator of an alternating current circuit breaker by a hybrid switch including a semiconductor switch and a fast relay. Advantage is that such a hybrid short circuit protection is able to disconnect many short circuits while a traditional miniature circuit breaker (MCB) can only disconnect a few and must then be replaced. Because no short circuit solenoid motor, arc-chamber and bimetal are needed the heat dissipation is much lower and therefore the circuit breaker can be made smaller or the free space can be used for other functionalities. By using an electronic short circuit detection a more accurate difference between real short circuits and just high inrush currents can be made. Since the traditional mechanical ON/OFF toggle is replaced by a hybrid switch, remote control of the MCB is easy to realize.

The application is the 'higher end' (high reliability, more functionality) industrial installations.

The MCB including a hybrid switch for short circuit disconnection is a first but important step to full semiconductor switching in AC mains distributions networks for residential and industrial applications. The technology is very easy to combine/integrate with Smart/Intelligent Technology's for monitoring energy, communication of status, current, voltage, energy etc. in Smart Grid or home-automation applications.

The present invention embodiments have been described above with reference to a number of exemplary embodiments as shown in the drawings. Modifications and alternative implementations of some parts or elements are possible, and are included in the scope of protection as defined in the appended claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. An alternating current circuit breaker, comprising:
   a live line between a live supply connecting terminal and a live load connecting terminal; and
   a neutral line between a neutral supply connecting terminal and a neutral load connecting terminal, for connecting an alternating current load to a mains supply;
   a first galvanic separation switch and a bypass switch connected in the live line;
   a second galvanic separation switch connected in the neutral line;
   a semiconductor switch element connected parallel to the bypass switch,
   wherein the first and second galvanic separation switch, the bypass switch and the semiconductor switch element are controlled using a processing unit,
   wherein the semiconductor switch element includes a combination of a rectifier bridge and an isolated gate bipolar transistor,
   wherein alternating current terminals of the rectifier bridge are connected in parallel to the bypass switch,
   wherein direct current terminals of the rectifier bridge are connected to an emitter and a collector terminal of the isolated gate bipolar transistor,
   wherein the processing unit is connected to a current measurement unit arranged in the live line,
   wherein the processing unit is arranged to control the bypass switch, the first and second galvanic separation switches, and a conducting state of the isolated gate bipolar transistor in case of detection of a short circuit condition, and
   wherein the current measuring unit is configured to measure:
   a momentary value of load current;
   a speed of increase of the load current;
   an RMS value of the load current; and/or
   a time information of the load current.

2. The breaker of claim 1, wherein the processing unit is configured to determine a short circuit situation if:
   the speed of increase of current is above a predetermined threshold value;
   the momentary value of the load current is more than ten times higher than a predetermined nominal load current; or
   the momentary value of the load current is higher than a predetermined current value for longer than a predetermined time period, as derived from the time information of the load current.

3. The breaker of claim 1, wherein the processing unit is arranged to determine an overcurrent situation if:
   the RMS value of the load current is above a predetermined threshold current value for a predetermined amount of time.

4. The breaker of claim 1, further comprising:
   a power supply unit connected to the live and neutral supply connecting terminals, which is configured to provide power to the processing unit.

5. The breaker of claim 1, further comprising:
   an overvoltage protection element connected in parallel to the bypass switch.

6. The breaker of claim 1, further comprising:
   a snubber circuit connected to the collector and emitter terminals of the isolated gate bipolar transistor.

7. The breaker of claim 1, wherein the current measurement unit includes a shunt resistor connected in the live line, and a short circuit and overcurrent detection unit configured to measure the voltage across the shunt resistor.

8. The breaker of claim 1, wherein the bypass switch and the first and second galvanic separation switches are electromechanical relay type switches,
    wherein the alternating current circuit breaker further includes a relay driver unit connected to the processing unit and to coil terminals of the bypass switch and the first and second galvanic separation switches.

9. The breaker of claim 1, wherein the processing unit is configured to switch on the alternating current circuit breaker by controlling the isolated gate bipolar transistor to its on state, and subsequently controlling the bypass switch to an on state, and
    wherein the processing unit is arranged to switch off the alternating current circuit breaker by controlling the bypass switch to an off state, and subsequently controlling the isolated gate bipolar transistor to its off state.

10. The breaker of claim 1, wherein the processing unit is configured to switch off the circuit breaker in case of a short circuit by:
    controlling the bypass switch to an off state;
    monitoring the voltage across the isolated gate bipolar transistor; and, if the voltage exceeds a predetermined voltage level,
    controlling the isolated gate bipolar transistor to its off state.

11. The breaker of claim 1, further comprising:
    an IGBT driver unit connected to the processing unit and a control input of the isolated gate bipolar transistor,
    wherein the IGBT driver unit is configured to switch off the isolated gate bipolar transistor in a two-stage process.

12. The breaker of claim 11, wherein the IGBT driver unit is further configured to monitor the voltage across the isolated gate bipolar transistor.

13. The breaker of claim 1, further comprising:
    a user interface connected to the processing unit.

14. The breaker of claim 1, further comprising:
    a communication interface connected to the processing unit.

15. The breaker of claim 1, wherein the processing unit is configured to control the circuit breaker by:
    controlling the bypass switch to an off state immediately upon detection of an overcurrent situation;
    subsequently controlling the isolated gate bipolar transistor to its off state upon detection of a short circuit situation or controlling the bypass switch to an on state upon detection of a non-short circuit situation.

16. The breaker of claim 1, wherein the bypass switch is a bi-stable magnetic latch type relay.

17. The breaker of claim 16, further comprising:
    an ON command storage capacitor; and
    an OFF command storage capacitor,
    configured to actuate the bi-stable magnetic latch type relay.

* * * * *